United States Patent
Haas

(10) Patent No.: US 10,724,639 B2
(45) Date of Patent: Jul. 28, 2020

(54) METAL FACE SEAL TAPER

(71) Applicant: Caterpillar Inc., Deerfield, IL (US)

(72) Inventor: Connor John Haas, New Braunfels, TX (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 15/956,149

(22) Filed: Apr. 18, 2018

(65) Prior Publication Data

US 2019/0323610 A1  Oct. 24, 2019

(51) Int. Cl.
*F16J 15/34* (2006.01)
*B62D 55/088* (2006.01)
*B62D 55/15* (2006.01)

(52) U.S. Cl.
CPC .......... *F16J 15/344* (2013.01); *B62D 55/088* (2013.01); *F16J 15/3408* (2013.01); *B62D 55/0887* (2013.01); *B62D 55/15* (2013.01); *F16J 15/3496* (2013.01)

(58) Field of Classification Search
CPC ........ F16J 15/34; F16J 15/344; F16J 15/3464; F16J 15/3468; B62D 55/088; B62D 55/0887; B62D 55/1587; B62D 55/15
See application file for complete search history.

(56) References Cited

U.S. PATENT DOCUMENTS

| | | | |
|---|---|---|---|
| 3,086,782 A | 4/1963 | Peickii et al. | |
| 3,108,370 A | 10/1963 | Peickii et al. | |
| 3,392,984 A | 7/1968 | Reinsma et al. | |
| 3,542,377 A * | 11/1970 | Voitik | F16J 15/344 277/380 |
| 3,623,737 A * | 11/1971 | Eckert | F16J 15/344 277/382 |
| 3,940,154 A * | 2/1976 | Olsson | F16J 15/162 277/381 |
| 4,094,514 A * | 6/1978 | Johnson | C22C 37/06 277/381 |
| 4,111,436 A * | 9/1978 | Yazawa | B62D 55/15 277/381 |
| 7,093,836 B2 * | 8/2006 | Tsuboi | F16J 15/344 277/358 |
| 9,138,805 B2 * | 9/2015 | Wodrich | B22D 19/08 |
| 9,656,705 B2 * | 5/2017 | Kalmes | B62D 55/088 |
| 9,714,713 B2 * | 7/2017 | Antoine | F16J 15/344 |
| 9,845,887 B2 | 12/2017 | Hoppe et al. | |
| 2007/0045966 A1 | 3/2007 | Jiang et al. | |
| 2008/0233303 A1 * | 9/2008 | Jiang | F16J 15/344 427/443.1 |
| 2009/0045586 A1 | 2/2009 | Cantow | |

(Continued)

*Primary Examiner* — Nicholas L Foster
(74) *Attorney, Agent, or Firm* — Law Office of Kurt J. Fugman LLC

(57) ABSTRACT

A face seal member includes a cylindrical annular body defining a cylindrical axis, a radial direction, a first axial extremity, a second axial extremity, an outside radial extremity and an inside radial extremity, a face sealing surface including a clearance surface, a contact region disposed radially adjacent the clearance surface that defines a contact plane, and a tapered surface extending radially from the contact region that defines a taper angle with the contact plane that increases as the tapered surface progresses further radially from the contact region toward the inside radial extremity.

18 Claims, 4 Drawing Sheets

(56) References Cited

U.S. PATENT DOCUMENTS

| | | | |
|---|---|---|---|
| 2012/0248706 A1* | 10/2012 | Hoppe | F16J 15/344 |
| | | | 277/399 |
| 2014/0175753 A1* | 6/2014 | Antoine | F16J 15/344 |
| | | | 277/358 |
| 2015/0284042 A1* | 10/2015 | Kalmes | B62D 55/088 |
| | | | 305/107 |
| 2017/0159148 A1* | 6/2017 | Barnes | C21D 9/40 |
| 2017/0335969 A1* | 11/2017 | Spangler | F16J 15/3436 |
| 2019/0002044 A1* | 1/2019 | Haas | B62D 55/0887 |
| 2019/0186632 A1* | 6/2019 | Haas | F16J 15/28 |

\* cited by examiner

METAL FACE SEAL TAPER

TECHNICAL FIELD

The present disclosure relates to a face seal assembly that prevents the loss of lubrication from a rotating joint used in equipment such as earth moving, construction and mining equipment and the like. Specifically, the present disclosure relates to face seal taper geometry employed in face seal assemblies.

BACKGROUND

Earth moving, construction and mining equipment and the like work are often used in rough, off-road terrain. These machines often employ an endless track with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, lubrication is necessary to ease the movement of a track roller as the track chain passes over it, allowing the shaft on which the track roller rotates to be fixed while the roller itself rotates. A face seal is often disposed at this interface between the track roller and the shaft, sealing in lubrication while allowing the roller to rotate on the shaft.

Similarly, such equipment may use power trains including a gearbox that is connected to a drive shaft or a wheel axle to power movement to a wheel. The shaft and axle are configured to rotate relative to a housing positioned near them that remains fixed. It is necessary to the ease the movement of the shaft or the axle relative to the housing or other fixed member by providing lubrication in the vicinity of the interface of the shaft or axle and the fixed member. A face seal is often disposed at this interface between the housing or other fixed member and the rotating shaft or rotating axle.

Over time, the face seal assembly experiences wear. Various factors influence wear and there are various types of wear. For example, radial wear and/or asymmetric wear may occur. With current seal face geometry, retarding radial wear may increase asymmetric wear and vice, versa. Either type of wear, radial wear or asymmetric wear, will eventually cause the face seal to no longer effectively seal the desired lubricant in the lubricating cavity formed by the rotating component and the fixed component. This can cause downtime for the machine and presents a cost to the end user who then needs to replace the face seal.

Accordingly, it is desirable to develop a face seal sealing surface that breaks the radial wear versus asymmetric wear trade-off or compromise.

SUMMARY

A face seal member according to an embodiment of the present disclosure includes a cylindrical annular body defining a cylindrical axis, a radial direction, a first axial extremity, a second axial extremity, an outside radial extremity and an inside radial extremity, a face sealing surface including a clearance surface, a contact region disposed radially adjacent the clearance surface that defines a contact plane, and a tapered surface extending radially from the contact region that defines a taper angle with the contact plane that increases as the tapered surface progresses further radially from the contact region toward the inside radial extremity.

A face seal assembly according to an embodiment of the present disclosure comprises a first face seal member including a cylindrical annular body defining a cylindrical axis, a radial direction, a first axial extremity, a second axial extremity, an outside radial extremity and an inside radial extremity, a face sealing surface including a clearance surface, a contact region disposed radially adjacent the clearance surface that defines a contact plane, and a tapered surface extending radially from the contact region that defines a taper angle with the contact plane that increases as the tapered surface progresses further radially from the contact region toward the inside radial extremity The face seal assembly may further comprise a second face seal member identically configured to the first face seal member.

A rotating joint according to an embodiment of the present disclosure comprises a stationary member defining a first seal retaining cavity, and a rotatable member defining a second seal retaining cavity. The first face seal member may be disposed in the first seal retaining cavity. The first face seal member may include a cylindrical annular body defining a cylindrical axis, a radial direction, a first axial extremity, a second axial extremity, an outside radial extremity and an inside radial extremity, a face sealing surface including a contact region that defines a contact plane, and a tapered surface extending radially from the contact region that defines a taper angle with the contact plane that increases as the tapered surface progresses further radially from the contact region toward the inside radial extremity. The tapered surface may be an arcuate surface that defines a tangent defining the taper angle, and the contact plane may be perpendicular to the cylindrical axis and the contact region may form the second axial extremity. A second face seal member may be disposed in the second seal retaining cavity.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
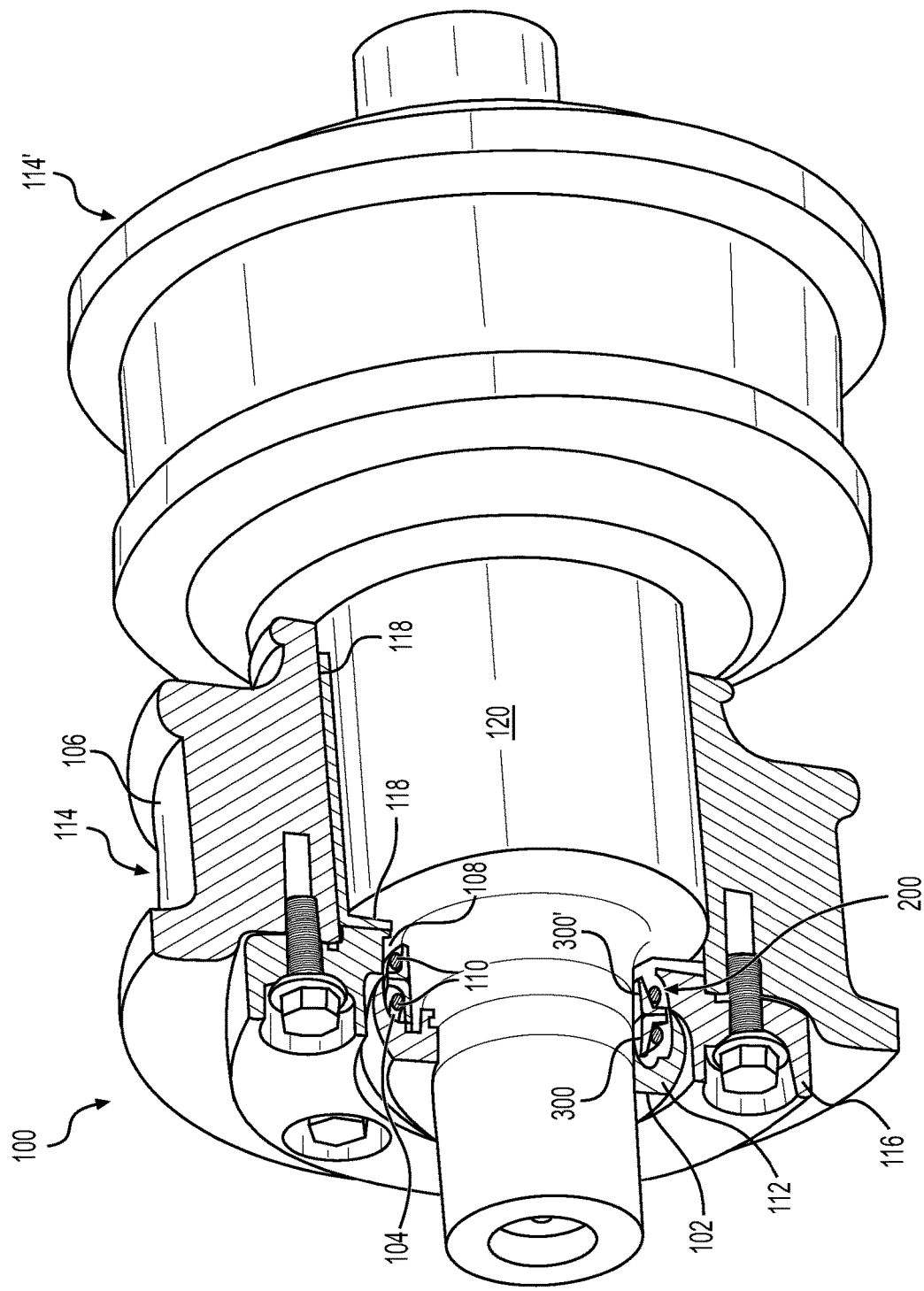
FIG. 1 is a perspective sectional view of a track roller assembly such as those used on track driven vehicles that may employ a face seal assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus such as a rotating joint that may use various embodiments of a face seal of the present disclosure will now be discussed. Then, a face seal assembly and a face seal member according to various embodiments of the present disclosure will be discussed.

Looking at FIG. 1 a rotating joint 100 for a track roller 102 is disclosed. The rotating joint 100 comprises a stationary member 102 defining a first seal retaining cavity 104, and a rotatable member 106 defining a second seal retaining cavity 108. A first face seal member 300 is disposed in the first seal retaining cavity 104 and a second face seal member 300' is disposed in the second seal retaining cavity 108. The first face seal member 300 and the second face seal member 300' may have identical configurations but not necessarily so. Load rings 110 are also shown (e.g. torics) that may be some sort of spring or elastomeric material, biasing the first face seal member 300 and the second face seal member 300' into contact with each other.

For the particular embodiment shown in FIG. 1, the stationary member 102 is an end cap 112 that defines the first seal retaining cavity 104 and the rotatable member is a track roller assembly 114 to which a cap member 116 is attached, defining the second seal retaining cavity 108. Bushing members 118 are also shown that reduce friction as the track roller assembly 114 rotates about the shaft 120 that is also stationary. One track roller assembly is shown having two symmetric sides 114, 114'.

Figure 2:
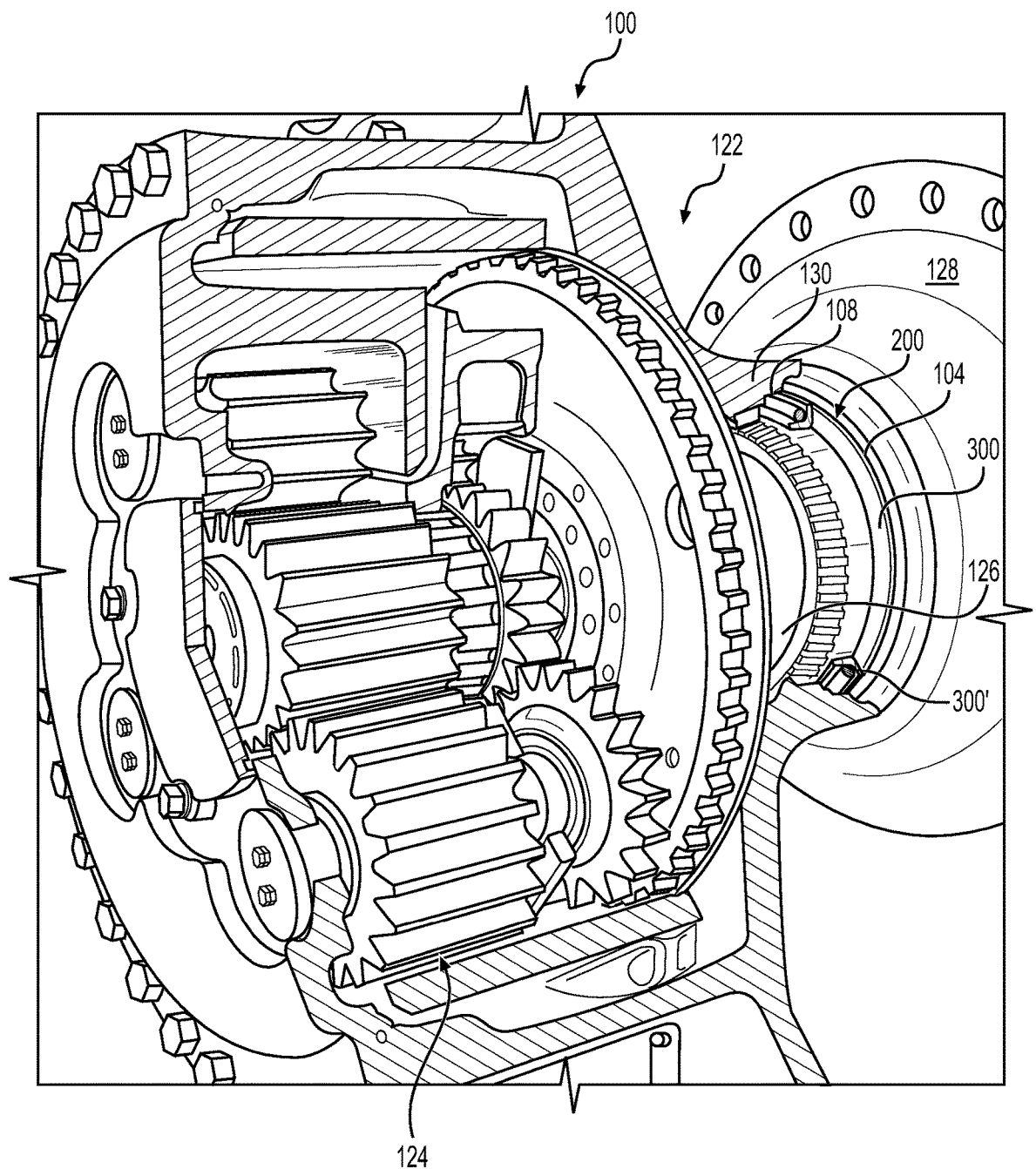
FIG. 2 is a perspective sectional view of a powertrain assembly such as those used on track driven vehicles that may employ a face seal assembly according to an embodiment of the present disclosure.

FIG. 2 shows a rotating joint 100 in the form of a powertrain final drive 122 that includes a wheel gearbox 124 about which a wheel or tire may be attached. A rotatable shaft 126 extends from a stationary housing 128 that defines the first seal retaining cavity 104 and a rotatable housing 130 that contains the wheel gearbox 124 and that defines and will rotate with the second seal retaining cavity 108.

Other types of apparatus and rotating joints other than those specifically shown in the figures or discussed in the present specification may use various embodiments of the face seal assembly or face seal member that will now be discussed with more particularity.

A face seal assembly 200 according to an embodiment of the present disclosure will now be described with reference to FIG. 3. The face seal assembly 200 may comprise a first face seal member 300 including a cylindrical annular body 302 defining a cylindrical axis 304, a radial direction 306, a first axial extremity 308, a second axial extremity 310, an outside radial extremity 312 (may also be referred to as outer diameter of the seal flange in some embodiments) and an inside radial extremity 314, and a face sealing surface 316.

The face sealing surface 316 may include a contact region 318 (may also be referred to as the flat band in some embodiments) that defines a contact plane 320, and a tapered surface 322 extending radially from the contact region 318 that defines a taper angle 324 with the contact plane 320 that increases as the tapered surface 322 progresses further radially from the contact region 318 toward the inside radial extremity 314. As shown in FIG. 3, the initial contact region before wear has occurred is shown. However, it is to be understood that over time wear will occur, which may cause the contact region to change configuration and location, etc. over time.

The face sealing surface 316 may further comprise a clearance surface 326 extending radially from the outside radial extremity 32 to the contact region 318. The contact region 318 may include a transitional line 328 formed by the intersection of the clearance surface 326 and the tapered surface 322. In practice, once loaded, deformation in the contact region 318 may cause a line of contact to widen to a contact area.

In some embodiments, the clearance surface 326 may include a flat surface 330 extending radially before being deformed due to loading. In other embodiments, the clearance surface 326 may form a clearance angle 332 with the radial direction 306 and/or the contact plane 320 that ranges from 0 degrees to 1 degree even before being deformed due to loading.

Loading may be provided by a first load ring 110 contacting the first face seal member 300. A second face seal member 300' identically configured to the first face seal member 300 may be provided. A second load ring 110 that may be identically configured to the first load ring may also be provided. This may not be the case in other embodiments.

Figure 3:
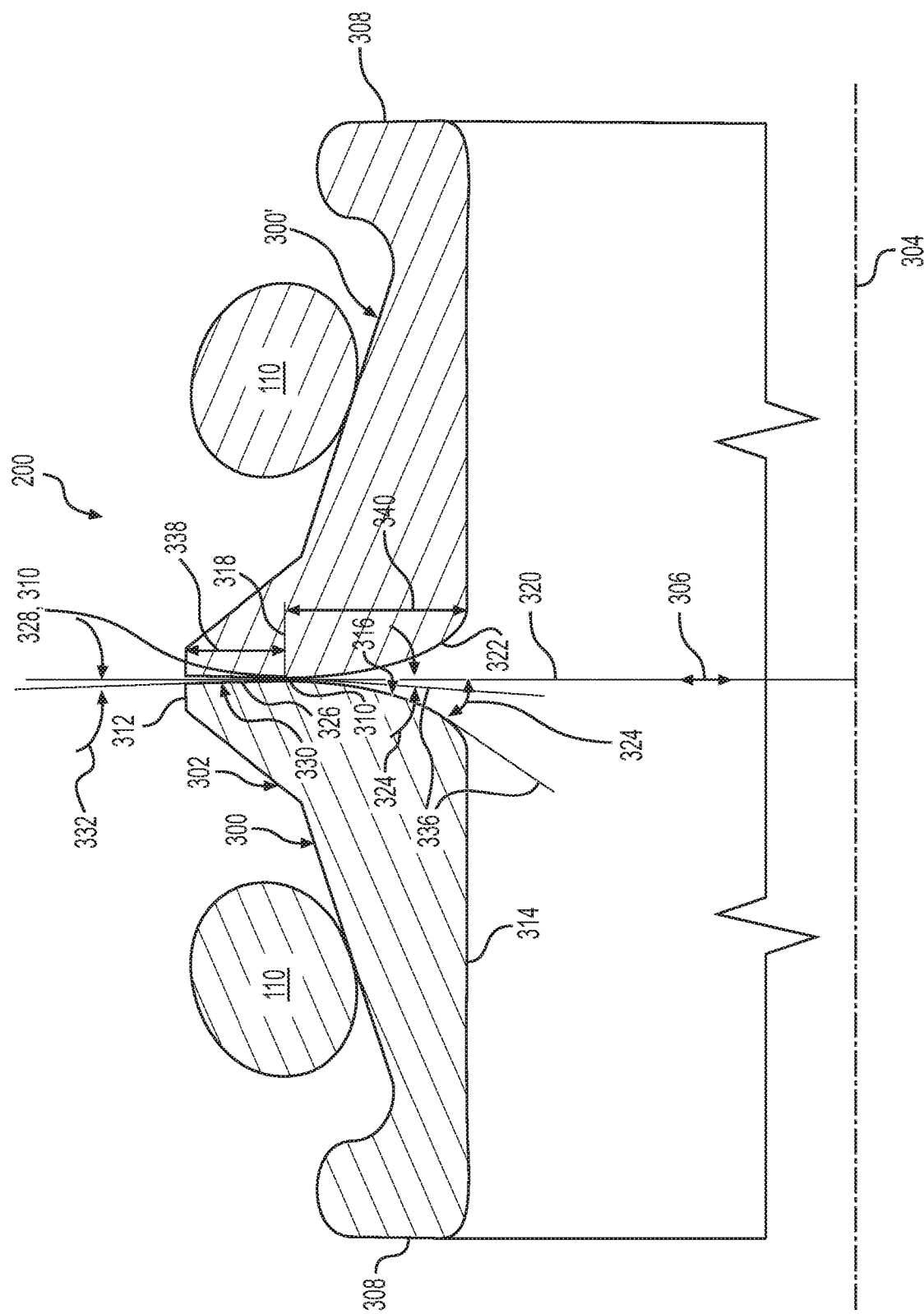
FIG. 3 is an enlarged sectional view of a face seal that may be used in the assemblies of FIGS. 1 and 2.

Focusing now in FIG. 3 on the tapered surface 322, the tapered surface 322 may be an arcuate surface 334 that defines a tangent 336 defining the taper angle 324. The contact plane 320 may be perpendicular to the cylindrical axis 304 and the contact region 318 may form the second axial extremity 310 in some embodiments. The contact plane 320 may not be perpendicular to the cylindrical axis 304 and the contact region 318 may not form the second axial extremity 310 in other embodiments.

In some embodiments, the taper angle 324 may range from 0.5 degrees radially adjacent the contact region 318 to 10 degrees radially adjacent the second axial extremity 310 in some embodiments. In particular embodiments, the taper angle may from 3 degrees radially adjacent the contact region 318 to 6 degrees radially adjacent the second axial extremity 310. The location and value of the taper angle may be varied as needed or desired in other embodiments to be something different than what has been specifically mentioned herein.

In some embodiments, the first and/or second face seal member 300, 300' may be made of any suitable material such as ceramic, metal, etc. In some embodiments, such as when the first and/or second face seal member 300, 300' is made from metal, the body 302 may have a surface hardness ranging from 25 Rockwell Scale C to 70 Rockwell Scale C. In some embodiments, the contact region 318 is not coated. In other embodiments, the contact region 318 may have a thermal sprayed, laser clad, MIG weld, plated, a DLC, or a PVD coating, etc.

With continued reference to FIG. 3, a first face seal member 300 according to an embodiment of the present disclosure may be characterized as follows. The first face seal member 300 may comprise a cylindrical annular body 302 defining a cylindrical axis 304, a radial direction 306, a first axial extremity 308, a second axial extremity 310, an outside radial extremity 312 and an inside radial extremity 314, and a face sealing surface 316.

The face sealing surface 316 may include a clearance surface 326 extending radially from the outside radial extremity 312, a contact region 318 disposed radially adjacent to the clearance surface 326 that defines a contact plane 320, and a tapered surface 322 extending radially from the contact region 318 that defines a taper angle 324 with the contact plane 320 that increases as the tapered surface 322 progresses further radially from the contact region 318 toward the inside radial extremity 314.

The contact region 318 may comprise a transitional line 328 defined by the intersection of the tapered surface 322 and the clearance surface 326. The clearance surface 326 may include a flat surface 330 forming a clearance angle 332 with the contact plane 320. The tapered surface 322 may be an arcuate surface 334 that defines a tangent 336 defining the taper angle 324. The contact plane 320 may be perpendicular to the cylindrical axis 304 and the contact region 318 may form the second axial extremity 310.

The taper angle 324 may range from 3 degrees radially adjacent the contact region 318 to 6 degrees radially adjacent the inside radial extremity 314. The clearance angle 332 may range from 0 degree to 1 degrees in some embodiments. In some embodiments, the body 302 is made from metal (e.g. steel) and has a surface hardness ranging from 25 Rockwell Scale C to 55 Rockwell Scale C. Hence, a ratio of the taper angle to the clearance angle ranges from 50 to 1, and more specifically from 6 to 1 in certain embodiments of the present disclosure. This may not be the case for other embodiments. Similarly, the contact region 318 may have a chromium, a DLC, or a PVD coating in some embodiments but may be uncoated in yet other embodiments.

The clearance surface radial length 338 may range from 1.5 mm to 4.0 mm in some embodiments, such as unworn components, while the tapered surface radial length 340 may range from 2.0 mm to 12.0 mm in other embodiments, such as when the components are unworn. Thus, a ratio of the tapered surface radial length to the clearance surface radial length may range from 1.33 to 3.0 in certain embodiments of the present disclosure. Any of these dimensions may be varied as needed or desired in other embodiments to be different than what has been specifically mentioned herein.

The arrangement and function of these various components of the face seal assembly or the face seal member may be altered as needed or desired.

INDUSTRIAL APPLICABILITY

In practice, a rotating joint, a face seal assembly, or a face seal member according to any embodiment described herein may be sold, bought, manufactured or otherwise obtained in an OEM or after-market context.

In some cases, the arcuate surface of the tapered surface may comprise a series of radial arcs, elliptical arcs, a polynomial such as a spline, etc. A CAD (computer aided design) program may be used to create the arcuate surface. For example, a series of points and tangent curves may be created as construction geometry. Then, a spline may be fit through the points that is tangent to the curves, thereby creating the spline. In addition to or in lieu of using a spline, various radial arcs that are tangent to the tangent lines with various taper angles may be created that are also tangent to each other to create the suitable geometry. When a spline is first created, a function in the CAD package may convert the spline to a series of arcs if so desired, etc. Once the geometry is created in CAD, then a similar CIM (computer integrated manufacturing) package may be used to create the desired machining data to machine the arcuate surface.

Figure 4:
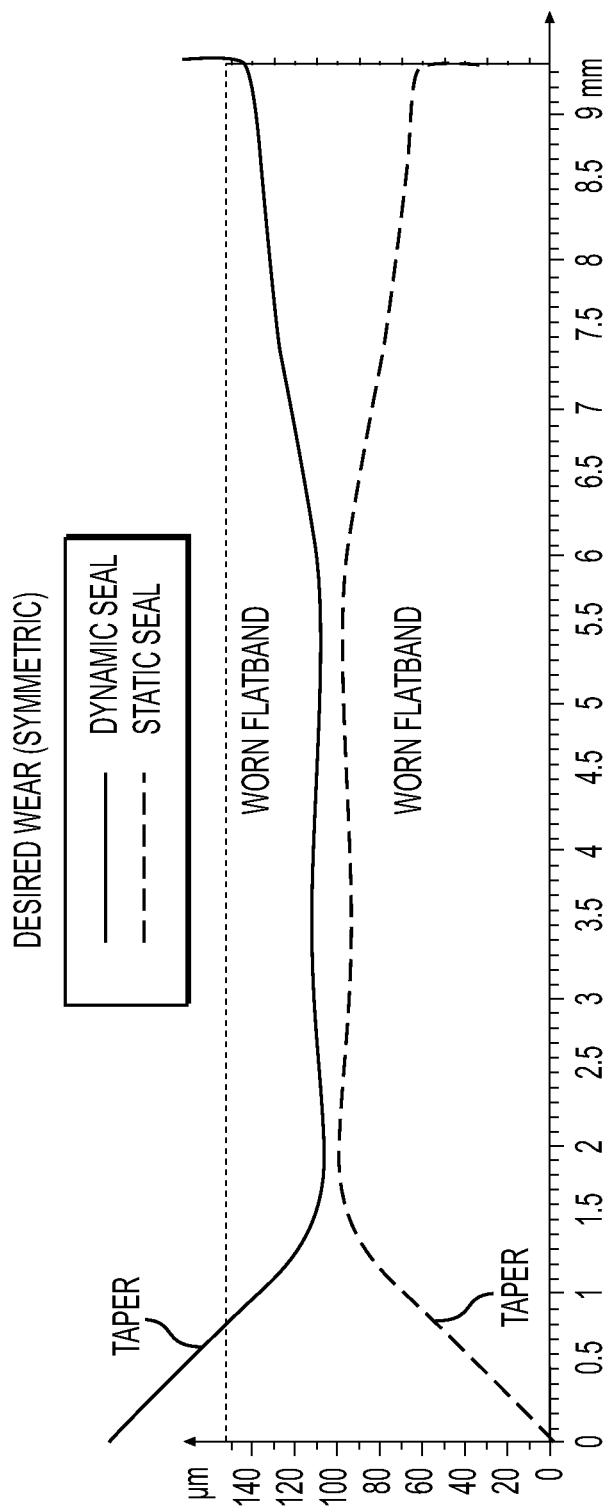
FIG. 4 is a graph illustrating that the face seal of FIG. 3 may exhibit desirable symmetrical wear over time in use.

Due to the tapered geometry, the wear between the first and the second face seal members may be symmetrical over time as shown in FIG. 4. Also, the amount of radial wear may be minimized. In other words, the radial wear versus symmetrical wear trade-off or compromise may be broken using the tapered face seal geometry employed by various embodiments of a face seal member disclosed herein.

While powertrain and undercarriage applications have been specifically discussed herein, it is contemplated that a face seal member, face seal assembly, etc. according to various embodiments of the present disclosure may be used in other applications. For example, such other applications may include agriculture, petroleum, tunneling, waste handling, forestry construction, military, and waste handling, etc. The seals may be used in various components such as drill heads, pumps, tunnel boring cutters, as well as the aforementioned final drives, axles, and undercarriage platforms.

Various embodiments of the face seal members and face seal assemblies may include specific embodiments such as metal face seals, Duo-Cone seals, floating seals, mechanical face seals, and Heavy Duty Dual Face (HDDF). Thus, the claims and specific properties of one embodiment should not be interpreted to be necessary in all the embodiments contemplated herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A face seal member for use in a rotating joint comprising:
    a cylindrical annular body defining a cylindrical axis, a radial direction, a first axial extremity, a second axial extremity, an outside radial extremity and an inside radial extremity;
    a face sealing surface including:
        a clearance surface extending radially from the outside radial extremity;
        a contact region disposed radially adjacent to the clearance surface that defines a contact plane; and
        a convex tapered surface extending radially from the contact region that defines a taper angle with the contact plane that increases as the convex tapered surface progresses further radially from the contact region toward the inside radial extremity;
    wherein the clearance surface forms a clearance angle with the contact plane, and the convex tapered surface is an arcuate surface that defines a tangent defining the taper angle, and a ratio of the taper angle to the clearance angle ranges from 50 to 1.

2. The face seal member of claim 1, wherein the contact region comprises a transitional line defined by the intersection of the convex tapered surface and the clearance surface.

3. The face seal member of claim 1, wherein the contact plane is perpendicular to the cylindrical axis, and the contact region forms the second axial extremity.

4. The face seal member of claim 3, wherein the taper angle ranges from 0.5 degrees radially adjacent the contact region to 10 degrees radially adjacent the inside radial extremity.

5. The face seal member of claim 4, wherein the clearance angle ranges from greater than 0 degrees to 1 degree and the taper angle ranges from 3 degrees radially adjacent the contact region to 6 degrees radially adjacent the inside radial extremity.

6. The face seal member of claim 1, wherein the body is made from metal and has a surface hardness ranging from 25 Rockwell Scale C to 70 Rockwell Scale C.

7. The face seal member of claim 6, wherein the contact region has a thermal sprayed, a laser clad, a MIG weld, a plated, a DLC, or a PVD coating.

8. A face seal assembly for use in a rotating joint comprising:
    a first face seal member including:
        a cylindrical annular body defining a cylindrical axis, a radial direction, a first axial extremity, a second axial extremity, an outside radial extremity and an inside radial extremity;
        a face sealing surface including:
            a contact region that defines a contact plane; and
            a convex tapered surface extending radially from the contact region that defines a taper angle with the contact plane that increases as the convex tapered surface progresses further radially from the contact region toward the inside radial extremity;
        a clearance surface extending radially from the outside radial extremity to the contact region, the contact region including a transitional line formed by the intersection of the clearance surface and the convex tapered surface, the clearance surface defining a clearance surface radial length; and
    a second face seal member having a mirrored configuration to that of the first face seal member;
    wherein the convex tapered surface defines a tapered surface radial length, and a ratio of the tapered surface radial length to the clearance surface radial length ranges from 1.33 to 3.0.

9. The face seal assembly of claim 8, further comprising a first load ring and a second load ring.

10. The face seal assembly of claim 8, wherein the clearance surface of the first face seal member forms a clearance angle with the contact plane.

11. The face seal assembly of claim 10, wherein the convex tapered surface of the first face seal member is an arcuate surface that defines a tangent defining the taper angle, the contact plane of the first face seal member is perpendicular to the cylindrical axis and the contact region forms the second axial extremity.

12. The face seal assembly of claim 11, wherein the taper angle of the first face seal member ranges from 0.5 degrees radially adjacent the contact region to 10 degrees radially adjacent the inside radial extremity.

13. The face seal assembly of claim 12, wherein the clearance angle of the first face seal member ranges from greater than 0 degrees to 1 degree and the taper angle ranges from 3 degrees radially adjacent the contact region to 6 degrees radially adjacent the inside radial extremity.

14. The face seal assembly of claim 8, wherein the body of the first face seal member is made from metal and has a surface hardness ranging from 25 Rockwell Scale C to 70 Rockwell Scale C, and the contact surface has a thermal sprayed, a laser clad, a MIG weld, a plated, a DLC, or a PVD coating.

15. A rotating joint comprising:
    a stationary member defining a first seal retaining cavity; and
    a rotatable member defining a second seal retaining cavity;
    a first face seal member disposed in the first seal retaining cavity, the first face seal member including:
        a cylindrical annular body defining a cylindrical axis, a radial direction, a first axial extremity, a second axial extremity, an outside radial extremity and an inside radial extremity;
        a face sealing surface including:
            a contact region that defines a contact plane; and
            a convex tapered surface extending radially from the contact region that defines a taper angle with the contact plane that increases as the convex tapered surface progresses further radially from the contact region toward the inside radial extremity, the convex tapered surface defines a tapered surface radial length;
        a clearance surface extending radially from the outside radial extremity to the contact region, the contact region including a transitional line formed by the intersection of the clearance surface and the convex tapered surface, the clearance surface defining a clearance surface radial length; and
        wherein the convex tapered surface is an arcuate surface that defines a tangent defining the taper angle, the contact plane is perpendicular to the cylindrical axis and the contact region forms the second axial extremity, and a ratio of the tapered surface radial length to the clearance surface radial length ranges from 1.33 to 3.0; and
    a second face seal member disposed in the second seal retaining cavity.

16. The rotating joint of claim 15, wherein the taper angle ranges from 0.5 degrees to 10 degrees.

17. The rotating joint of claim 15, wherein the stationary member is an end cap and the rotatable member is a cap member of a track roller.

18. The rotating joint of claim 15, wherein the stationary member is a stationary housing and the rotatable member is a rotatable housing.

* * * * *